United States Patent [19]

Havens et al.

[11] 4,256,317
[45] Mar. 17, 1981

[54] HIGH-TEMPERATURE, HIGH-PRESSURE VALVE PACKING SYSTEM

[75] Inventors: Marvin R. Havens, St. Albans; Donald R. Fields, Cross Lanes; Douglas J. Miller, South Charleston, all of W. Va.

[73] Assignee: Union Carbide Corporation, New York, N.Y.

[21] Appl. No.: 143,334

[22] Filed: Apr. 24, 1980

[51] Int. Cl.³ .............................................. F16J 15/16
[52] U.S. Cl. ...................................... 277/112; 377/124; 377/DIG. 6
[58] Field of Search .......... 277/112, 123, 124, DIG. 6

[56] References Cited

U.S. PATENT DOCUMENTS

| 2,113,098 | 4/1938 | Skinner | 277/112 |
|---|---|---|---|
| 2,326,268 | 8/1943 | Walter | 277/112 |
| 2,903,281 | 9/1959 | Avery | 227/124 |
| 3,108,018 | 10/1963 | Lewis | 277/DIG. 6 |
| 3,121,554 | 2/1964 | Potchen | 277/112 |
| 3,404,061 | 10/1968 | Shane et al. | |
| 3,776,612 | 12/1973 | Barlow | 277/DIG. 6 |
| 3,932,008 | 1/1976 | McCloskey et al. | 277/DIG. 6 |
| 4,068,853 | 1/1978 | Schnitzler | 277/DIG. 6 |
| 4,160,551 | 7/1979 | Nixon et al. | 277/DIG. 6 |

Primary Examiner—Robert I. Smith
Attorney, Agent, or Firm—Gerald R. O'Brien, Jr.

[57] ABSTRACT

Valve packing system comprising a compacted body of expanded graphite material having an apparent bulk density 1.6 to 2.0 times its apparent bulk density prior to compaction and positioned in stuffing box with zero clearance between each of valve stem and said stuffing box, and a pair of flat carbon guide rings retaining said compacted body and machined to close internal clearance with said valve stem and close external clearance with the internal walls of said stuffing box.

14 Claims, 4 Drawing Figures

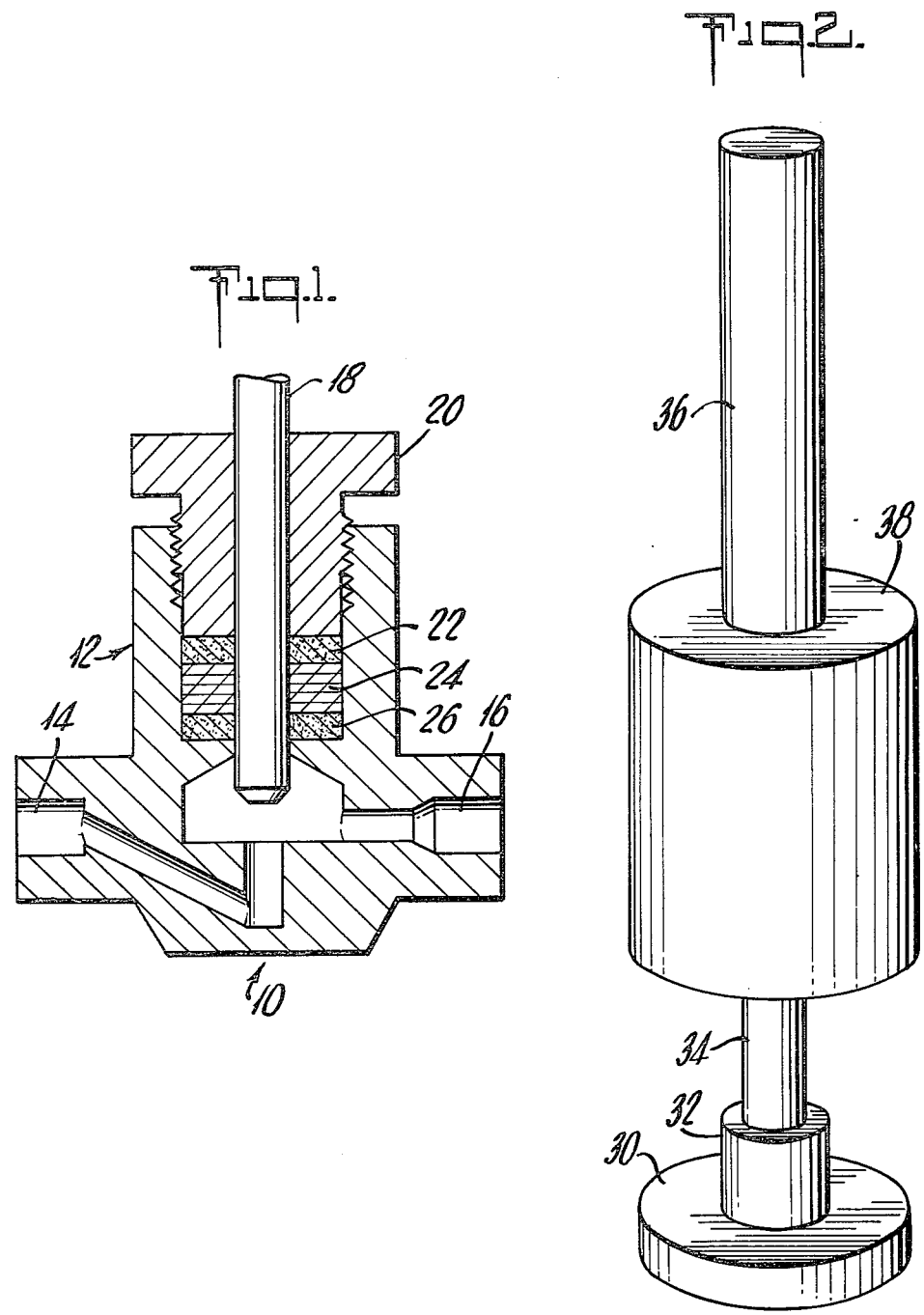

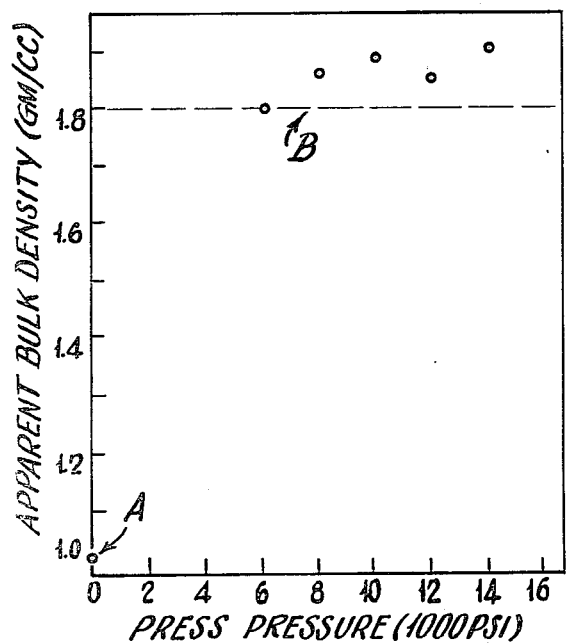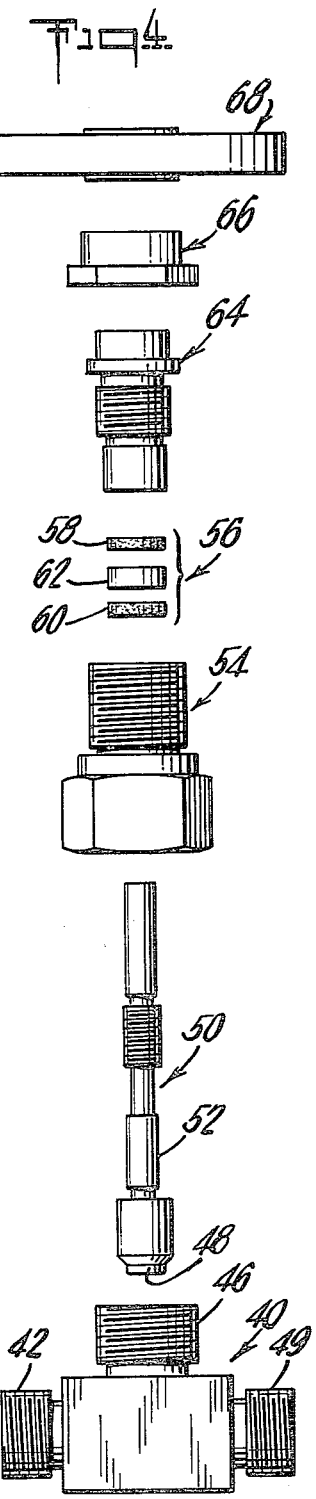

HIGH-TEMPERATURE, HIGH-PRESSURE VALVE PACKING SYSTEM

The present invention relates to valve packing systems and, more particularly, to such systems employing expanded graphite material.

Valve packings that confine high-temperature, high-pressure gas (or vapor) are required in various chemical and petroleum processes. The most difficult to confine gas is hydrogen (which is often encountered in petrochemical processes like hydrotreating, hydrodefulfurization, hydrocracking, etc.) where process conditions can exceed 430° C. and 3000 psi. The ability to confine hydrogen at these conditions will become increasingly important as synthetic fuels processes are commercialized.

In general, there are two approaches to making a valve suitable for high temperatures. One is to extend the valve bonnet so that the packing is some distance from the hot process fluid and thus is cooler. In this approach a low temperature packing material can be used. The other is to employ a resilient high temperature packing material in a bonnet near the hot process fluid. Often, both approaches are employed where an extended bonnet is used with a high temperature packing.

Asbestos-based materials are often used where the temperatures are below 380° C. At higher temperatures asbestos loses its water of hydration and the binder often decomposes resulting in packing leakage.

Expanded graphite material, one of the best high temperature packing materials, is available in resilient, flexible ribbons and sheets under the name of "Grafoil". "Grafoil" expanded graphite material has the unique combination of high temperature stability, resiliency and lubricity. It is capable of operation at temperatures up to 1650° C. and is inert to most process fluids. Because of these properties, "Grafoil" is often specified as the valve packing material to confine hydrogen at high temperature and high pressure.

*Register trademark of Union Carbide Corporation.

However, it was found that some expanded graphite-packed hand valves had a high packing failure rate. The most significant problem was that expanded graphite material becomes somewhat fluid under stuffing box pressure and could extrude out of the stuffing box. For high temperature operation, generous clearances are necessary to prevent metal galling and valve seizure. The necessary metal-to-metal clearances allow the "Grafoil" to extrude under high stuffing box pressure. Valve packing life was presented with another problem. The hand valve packing appeared to suffer somewhat from abrasion resulting from the stem rotating in the packing.

In some motor valves, the long thin valve stem was flexible and could put a side load on the packing. This loading was pushing the packing aside and opening up a leak channel. Thus, packing life in hand and motor valves was short.

The "Grafoil" problems were traced back, in part, to the packing which had an apparent bulk density of about 1.1–1.4 gr/cc. Because expanded graphite packing material bulk density is known to be important to confine a gas-like hydrogen, it was necessary to form high density packing material by compaction. Apparent bulk densities of about 1.8 were thus formed from commercial "Grafoil" ribbon packed material having an apparent bulk density of about 1.1 gr/cc. This was necessary to confine the gas.

To this packing, a very small amount of finely-divided nickel powder in a thick oil paste was added. This was done by dry-brushing a bit on and wiping dry prior to compaction. Sufficient nickel paste was retained in the interstices. This made the valves significantly easier to operate and virtually eliminated the expanded graphite material transfer. It is believed that this greatly increases the packing lifetime.

Some expanded graphite material also adhered to the valve stem. The production stems had a 10 micro-inch finish (light grinding marks visible) which had some "tooth" to pick up expanded graphite material. Silver and chrome plating on the stem was unacceptable from process considerations. Chrome is not a preferred surface for expanded graphite material. Straight-forward polishing of the stems with diamond rouge to a mirror finish was tested and found to work. It has been found that polishing the valve stem made the valves easier to work and reduced the expanded graphite material transfer. Normally, expanded graphite material will tightly adhere to a polished surface which leads to increased material transfer. The use of nickel paste appears to prevent this.

The expanded graphite extrusion normally encountered heretofore was eliminated by the use of baked or graphitized carbon rings above and below the packed material. The carbon rings were machined to be in close clearance, e.g., a tight but not interference fit. Such carbon material is very temperature stable and is non-abrasive. It is also inert to almost all process fluids except strong oxidizers. It has very little void volume for gas to leak through.

The expanded graphite packing material employed in the present invention is capable of providing a seal which is effective for a wide variety of fluids over widely varying conditions of temperature and pressure, e.g., temperatures of from cryogenic to 1650° C., or higher, and pressures up to 3,000 psia., or higher. While it is possible to employ plain or non-corrugated expanded graphite ribbon or tape to effect the desired seal, the non-corrugated material is more fragile and difficult to use than the corrugated form of this material, and, therefore, less preferred. Corrugated ribbon or tape of expanded graphite, on the other hand, in which the corrugations run across the width of the ribbon or tape, is more flexible and easier to wrap around a curved surface of small diameter, and is preferred for this reason. General valve packing use of this material is disclosed in U.S. Pat. No. 4,068,853 issued on Jan. 17, 1978.

Expanded graphite can be formed by expanding graphite particles of natural or synthetic origin by a factor of at least 80 times in the "c" crystallographic axis dimension, and then compressing the expanded particles to form a cohesive structure. The expansion of graphite particles can readily be achieved by attacking the bonding forces between layer planes in the internal structure of the graphite. The result of such an attack is that the spacing between the superimposed layers can be increased so as to effect a marked expansion in the direction perpendicular to the layers which is the "c" axis direction. The expanded particles can be formed under a slight pressure into a foam material since the particles have the ability to adhere without a binder due to the large expansion. Tapes, sheets, strips and the like are formed from the expanded particles by simply increasing the compressive pressure, the density of the formed graphite being related to the applied formation pressure. A full description of the method of making expanded graphite can be found in U.S. Pat. No. 3,404,061 issued on Oct. 1, 1968.

Corrugated expanded graphite can be made from non-corrugated expanded graphite by passing sheets, ribbons or tapes of the non-corrugaged material through a pair of corrugating rolls. Both corrugated and non-corrugated forms of the material are commercially available under the trade name "Grafoil" in a variety of widths. Ribbons and tapes having widths of form one-quarter inch or one inch, and thicknesses of from 0.005 inches to 0.020 inches can be readily prepared. Most of these materials had apparent bulk densities up to about 1.1–1.4 gr/cc.

It is, therefore, the object of the present invention to provide a valve packing system free of all of the above-enumerated problems and difficulties normally encountered in valves employed for high temperature and high pressure service with low molecular weight gases.

Other aims and advantages of the invention will be apparent from the following description and appended claims.

In accordance with the present invention, a valve packing system capable of gas-tight sealing of low molecular weight gases at extremes of temperature and pressure is provided comprising, in combination with a valve stem and a valve stuffing box, a compacted body of expanded graphite material having an apparent bulk density of 1.6 to 2.0 times its apparent bulk density prior to compaction and positioned in and formed to contour said stuffing box with substantially zero clearance between each of said valve stem and said valve stuffing box and a pair of flat baked or graphitized carbon guide and support bearing rings or bushings positioned to retain said compacted body of expanded graphite material therebetween and machined to operate in close internal clearance with the internal walls of said stuffing box.

In the drawings:

FIG. 1 is a schematic view, in vertical cross-section, of a typical packed valve;

FIG. 2 is a schematic perspective view of hydraulic die forming means for the production of compacted bodies of expanded graphite packing material;

FIG. 3 is a graph showing the apparent bulk density of the expanded graphite material as a function of compacting press pressure; and FIG. 4 is an exploded, elevational view of a valve employing the packing material of the invention.

A four-part die press was designed and built to hydraulically form packing to fit the valves. The mandrel is the same outer diameter as the valve stem. The barrel's bore is the same as the inner diameter of the stuffing box. The base has a step to align the barrel and mandrel. With the base, mandrel and barrel assembled, a packing material, such as rope, foil, tape, sheet, etc. is wrapped around the mandrel and slipped into the barrel. The ram is placed over the mandrel and into the barrel. This assembled die may be used between the platens of a press.

The employment of a compacting die press, as shown in FIG. 2, made possible the forming and increase in the apparent bulk densities (specific gravities) of the expanded graphite material bodies processed. As there shown, the base 30 supports relatively large diameter step member 32 and connecting smaller diameter mandrel rod 34. The mandrel rod 34 passes through the hydraulically-driven shaft 36 which supports outer press barrel 38. The expanded material is applied in tape or other form to the mandrel 34 and, upon action of the die forming operation, the compacted body of expanded material was formed with the desired "substantially zero" clearances (up to about 0.0005 inch) and apparent densities (or specific gravities) in the die between the external surface of mandrel 34 and internal surface of outer die member 38 against the top of step member 32.

A packing ring formed from expanded graphite material ribbon could seal the valve if it were properly compressed. Vendor-supplied "Grafoil" had an apparent bulk density of 1.0 gr/cc.

The packing die press achieves apparent bulk densities of preferably about 1.8 as shown at "B" in FIG. 3 of the drawings. This indicated that the original packing material, as shown as "A" in FIG. 3 of the drawings had a significant void volume for gas to percolate through and show up as a stem or stuffing box wall leak.

Referring specifically to the drawings, the valve embodiment of FIG. 1 comprises a valve body 10, and upper stuffing box 12 and gas inlet and outlet means 14 and 16, respectively. A valve shaft or stem 18 is supported by and passes through a gland nut 20 which is threadably retained in the upper portion of stuffing box 12. The lower portion of the stem 18 passes, in turn, through upper baked or graphitized carbon guide and support bearing ring 22, expanded graphite material body 24, lower guide and support bearing ring 26, and then into the center of the valve body where seating occurs.

The high apparent bulk density expanded graphite material also reduced the amount of packing extruding from the stuffing box. However, it did not eliminate it. This matter is discussed below.

Lubricant was incorporated onto the expanded graphite material packing with a high temperature lubricant, "Nickel Ease*". This lubricant is a very high purity nickel powder in a thick oil paste. Up to this point, the packing had been made from two strips of expanded graphite material ribbon. The experiments showed that a minimum amount of "Nickel Ease" dry-brushed onto one side of only one ribbon (both ribbons then pressed into a ring) gave very slick, mechanically sound packings. This confined high pressure as well as normal expanded graphite material and could be operated with a fraction of the torque required for a Teflon-packed valve. The only problem was that the lubricated packing was more extrusion-prone than plain expanded graphite material but was still more extrusion-resistant than the low-density expanded graphite material. This extrusion was solved by the use of graphite rings, discussed hereinbelow.

*Trademark of Felpro Inc.-Chicago, Ill.

While a 0.020 inch or less stuffing box-to-stem clearance should retain expanded graphite material, the pressure in the high pressure stuffing box extruded the expanded graphite material body through a 0.010 inch gap. Work began to reduce the clearance with some non-galling high temperature material. It was apparent that some stem support was necessary at the bottom of the stuffing box.

Metal and ceramic bushing materials were tried but each presented problems. Metals could still seize at high temperatures. Ceramics were abrasive. Carbon bushings presented no such problems. Carbon in the form of a flat ring with a stem clearance of 0.001 inch (I.D.) and a bonnet clearance of 0.002 inch (O.D.), both "close"

clearance (up to about 0.002 inch) was fabricated, tested and found to work well.

Three different types of carbon were tested. These were extruded, ungraphitized carbon, graphitized carbon and a high density, impregnated carbon. All of these materials worked well. They had the structural integrity to operate at high temperatures and pressures, and could be removed intact.

Accordingly, the important features of the valve and packing material system of the present invention are:
  Highly polished stem;
  High apparent bulk density packing material;
  Lubrication of packing material; and
  Baked carbon or graphite rings as packing retainers and stem guides.

The valve packing system, with a pair of flat baked or graphitized carbon guide and support bearing rings retaining the compacted body of expanded graphite material provides the heart of the present invention. The materials of the bearing rings and the compacted expanded graphite material provide a compatibility from the abrasion resistance, temperature tolerance, galling resistance and other physical standpoints. The expanded form of the packing material provides the ability to be compacted to the degree desired to attain the substantially zero clearances required at the inner and outer surfaces of the material body and to confine gases like hydrogen at high temperature and pressure. The baked or graphitized (non-expanded) carbon bearing rings are capable of being easily machined to close clearance at their inner and outer surfaces.

The use of highly polished valve stem surfaces in the area of the packing material contact and the use of metal powdered lubricant, discussed hereinabove, is not believed to be essential to the invention but to constitute a highly desirable preferred embodiment thereof.

The densification of the expanded graphite material by compaction to a value in the range of apparent bulk density of from 1.6 to 2.0 gr/cc is essential to attainment of the packing material characteristics required. The attainment of substantially zero clearances of the inner and outer surfaces of the expanded graphite material body is extremely difficult if not impossible to achieve by in situ operations in the stuffing box of a valve. One aspect of the present invention provides the die forming of the graphite material body at a point remote from the valve in an independent die forming operation which provides both the compaction of the material body and the cutting or forming of the inner and outer substantially zero clearance surfaces required. It has been found that a very high degree of reproducibility can be achieved by such an operation, as against the compaction of the material body in a stuffing box. This is believed so because of the steady, indirect compaction developed by apparatus such as a hydraulic ram and because all of the force is axially delivered rather than obtained through turning of a compression nut with the material body in a stuffing box.

By the use of properly machined carbon bearing rings to support the material body, the rings act as guides for the valve stem (i.e. will advantageously slip and rotate past the stem), and will not "creep" from their proper positioning due to the provision of proper clearances for both the material body and the retaining pair of carbon bearings rings. All of these features become evident when accentuated by dealing with valves of large diameter wherein there is a considerable amount of stem slippage and rotation.

A valve assembly embodying the preferred valve packing system of the invention is set forth in FIG. 4 of the drawings. As there shown, a valve body 40 has inlet gas port means 42, outlet gas port means 44 and stuffing box port means 46. Valve closure means 48 is positioned at the lower end of valve stem 50. The surface of the stem in the region 52 is highly polished. The stuffing box closure nut 54 engages the threaded portion 46 of the stuffing box. The packing set 56, comprises the upper and lower retaining rings, 58 and 60, which support the compacted body of expanded graphite material 62. The packing set is followed by the one-piece nut and follower combination 64 and then, in turn, the closure nut 66 and stuffing box handle 68.

The preferred packing set for this valving application was found to be one-half inch high. Both graphite rings are one-eighth inch high and are machined to a tight, slip-fit on the stem and stuffing box. The expanded graphite ring was one-quarter inch high and was made from two six-inch long strips of ribbon. Such dimensions may vary for other valve designs or applications. The lubricant was sparingly dry-brushed onto one side of only one expanded graphite strip. Compression pressure was 10,000 psi, which gave an expanded graphite material density of 1.9 gm/cc.

The valve and packing material was tested with helium in the following test sequence.
  3000 psi, ambient temperature
  1500 psi, 250° C.
  1500 psi, 450° C.
  1500 psi, 600° C.
  3000 psi, ambient temperature The valves of the invention passed the full leak test. Later a heater control failed which put full, uncontrolled heat on two test valves. The heated line reached 770° C. The valves worked easily at these temperatures and 1500 psi. The only leak observed was a few tiny helium bubbles that excaped only while the valve stem was rotated. They disappeared when the valve stem was stationary.

To date over one hundred valves embodying the present invention has been assembled, tested and used without packing or galling problems. Normal operations have been 380°–400° C. at 750–1000 psi. No leaks have been found at valve stems.

This same valve packing system, graphite rings and compacted, expanded graphite material, has been applied to several motor valves. These valves have been in service over four months without any problems.

What is claimed is:

1. A valve packing system capable of gas-tight sealing of low molecular weight gases at extremes of temperature and pressure comprising, in combination with a valve stem and a valve stuffing box, a compacted body of expanded graphite material having an apparent bulk density from 1.6 to 2.0 times its bulk density prior to compaction and positioned in and formed to contour said stuffing box with substantially zero clearance between each of said valve stem and said valve stuffing box, and a pair of flat baked or graphitized carbon guide and support bearing rings or bushings positioned to retain said compacted body of expanded graphite material therebetween and machined to operate in close internal clearance with said valve stem and close external clearance with the internal walls of said stuffing box.

2. The valve packing system in accordance with claim 1, wherein said compacted body of expanded graphite material has an apparent bulk density approximately 1.8 times its specific gravity prior to compaction.

3. The valve packing system in accordance with claim 1, wherein said valve stem has been highly polished with an abrasive to provide a mirror finish in the packing system area.

4. The valve packing system in accordance with claim 1, wherein expanded graphite material has been impregnated with a high temperature nickel metal powder lubricant, in the form of a heavy oil paste, prior to compaction.

5. The valve packing system in accordance with claim 1, wherein said body of expanded graphite material comprises a plurality of layers of corrugated ribbon or tape of expanded graphite material.

6. A valve packing system capable of gas-tight sealing of low molecular weight gases at extremes of temperature and pressure comprising, in combination with a valve stem and a valve stuffing box, a compacted body of expanded graphite material having an apparent bulk density 1.6 to 2.0 times its bulk density prior to compaction and positioned in and formed to contour said stuffing box with substantially zero clearance between each of said valve stem and said valve stuffing box, and a pair of flat baked or graphitized carbon guide and support bearing rings or bushings positioned to retain said compacted body of expanded graphite material therebetween and machined to operate in close internal clearance with said valve stem and close external clearance with the internal walls of said stuffing box, said valve stem having been highly polished with an abrasive to provide a mirror finish in the packing system area, said expanded graphite material having been impregnated with a high temperature nickel metal powdered lubricant, in the form of a heavy oil paste, prior to compaction.

7. A valve packing system capable of gas-tight sealing of low molecular weight gases at extremes of temperature and pressure comprising, in combination with a valve stem and a valve stuffing box, a compacted body of expanded graphite material having an apparent bulk density of approximately 1.8 times its bulk density prior to compaction and positioned in and formed to contour said stuffing box with substantially zero clearance between each of said valve stem and said valve stuffing box, and a pair of flat baked or graphitized carbon guide and support bearing rings or bushings positioned to retain said compacted body of expanded graphite material therebetween and machined to operate in close external clearance with said valve stem and close external clearance with the internal walls of said stuffing box, said valve stem having been highly polished with an abrasive to provide a mirror finish in the packing system area, said expanded graphite material having been impregnated with a high temperature nickel metal powdered lubricant, in the form of a heavy oil paste, prior to compaction.

8. A valve packing system capable of gas-tight sealing of low molecular weight gases at extremes of temperature and pressure comprising, in combination with a valve stem and a valve stuffing box, a remotely-compacted body of expanded graphite material having an apparent bulk density 1.6 to 2.0 times its bulk density prior to compaction by precision die compression and positioned in and die formed to contour said stuffing box with substantially zero clearance between each of said valve stem and said valve stuffing box, and a pair of flat baked or graphitized carbon guide and bearing rings or bushings positioned to retain said compacted body of expanded graphite material therebetween and machined to operate in close internal clearance with the internal walls of said stuffing box.

9. The valve packing system in accordance with claim 8, wherein said compacted body of expanded graphite material has an apparent bulk density approximately 1.8 times its bulk density prior to compaction.

10. The valve packing system in accordance with claim 8, wherein said valve stem has been highly polished with an abrasive to provide a mirror finish in the packing system area.

11. The valve packing system in accordance with claim 8, wherein expanded graphite material has been impregnated with a high temperature nickel metal powder lubricant, in the form of a heavy oil paste, prior to compaction.

12. The valve packing system in accordance with claim 8, wherein said body of expanded graphite material comprises a plurality of layers of corrugated ribbon or tape of expanded graphite material.

13. A valve packing system capable of gas-tight sealing of low molecular weight gases at extremes of temperature and pressure comprising, in combination with a valve stem and a valve stuffing box, a remotely-compacted body of expanded graphite material having an apparent bulk density 1.6 to 2.0 times its apparent bulk density prior to compaction by precision die compression and positioned in and die formed to contour said stuffing box with substantially zero clearance between each of said valve stem and said valve stuffing box, and a pair of flat baked or graphitized carbon guide and support bearing rings or bushings positioned to retain said compacted body of expanded graphite material therebetween and machined to operate in close internal clearance with said valve stem and close external clearance with the internal walls of said stuffing box, said valve stem having been highly polished with an abrasive to provide a mirror finish in the packing system area, said expanded graphite material having been impregnated with a high temperature nickel metal powdered lubricant, in the form of a heavy oil paste, prior to compaction.

14. A valve packing system capable of gas-tight sealing of low molecular weight gases at extremes of temperature and pressure comprising, in combination with a valve stem and a valve stuffing box, a remotely-compacted body of expanded graphite material having an apparent bulk density approximately 1.8 times its bulk density prior to compaction by precision die compression and positioned in and die formed to contour said stuffing box with substantially zero clearance between each of said valve stem and said valve stuffing box, and a pair of flat baked or graphitized carbon guide and support bearing rings or bushings positioned to retain said compacted body of expanded graphite material therebetween and machined to operate in close external clearance with said valve stem and close external clearance with the internal walls of said stuffing box, said valve stem having been highly polished with an abrasive to provide a mirror finish in the packing system area, said expanded graphite material having been impregnated with a high temperature nickel metal powdered lubricant, in the form of a heavy oil paste, prior to compaction.

* * * * *